(12) United States Patent
Zehnder, II et al.

(10) Patent No.: US 6,732,517 B2
(45) Date of Patent: May 11, 2004

(54) RETAINER FOR BRAKE MASTER CYLINDER TRAVEL SENSOR

(75) Inventors: James W. Zehnder, II, Tipp City, OH (US); Alan H. Green, Germantown, OH (US)

(73) Assignee: Delphi Technologies, Inc., Troy, MI (US)

(*) Notice: Subject to any disclaimer, the term of this patent is extended or adjusted under 35 U.S.C. 154(b) by 53 days.

(21) Appl. No.: 10/099,303

(22) Filed: Mar. 15, 2002

(65) Prior Publication Data

US 2003/0172651 A1 Sep. 18, 2003

(51) Int. Cl.[7] .............................................. B60T 17/22
(52) U.S. Cl. ...................... 60/534; 92/5 R; 92/165 PR
(58) Field of Search ..................... 92/5 R, 165 PR; 60/534

(56) References Cited

U.S. PATENT DOCUMENTS

| | | | |
|---|---|---|---|
| 4,648,262 A | * | 3/1987 | Reis et al. ................. 73/54.18 |
| 4,896,584 A | * | 1/1990 | Stoll et al. ..................... 92/5 R |
| 4,914,916 A | * | 4/1990 | Leigh-Monstevens et al. ............................ 60/534 |
| 4,982,652 A | * | 1/1991 | Blatt ............................ 92/5 R |
| 5,095,702 A | * | 3/1992 | Volz ........................ 92/165 R |
| 5,568,760 A | * | 10/1996 | Volzer ......................... 92/5 R |
| 6,164,183 A | | 12/2000 | Fulks et al. |
| 6,186,026 B1 | | 2/2001 | Shaw et al. |
| 6,276,137 B1 | | 8/2001 | Kottmyer et al. |
| 6,298,746 B1 | | 10/2001 | Shaw |
| 6,464,045 B2 | | 10/2002 | Weber et al. |
| 6,464,306 B2 | | 10/2002 | Shaw et al. |
| 6,564,694 B2 | | 5/2003 | Zumberge et al. |

OTHER PUBLICATIONS

From a journal called Research Disclosure, "*Travel Sensor Magnet and Master Cylinder Piston Integration and Orientation Method*", Published in Jun. of 2001 under the identification No. 446023.

* cited by examiner

Primary Examiner—Edward K. Look
Assistant Examiner—Michael Leslie
(74) Attorney, Agent, or Firm—Michael D. Smith

(57) ABSTRACT

An assembly for sensing travel by a piston in a master cylinder comprises a magnet and a retainer for retaining the magnet proximate the piston. An orientation screw engages an axial slot in the piston to inhibit rotation of the piston.

20 Claims, 2 Drawing Sheets

RETAINER FOR BRAKE MASTER CYLINDER TRAVEL SENSOR

CROSS-REFERENCE TO RELATED APPLICATIONS

This application is related to U.S. patent application Ser. No. 09/842,478 filed Apr. 25, 2001, which is hereby incorporated by reference.

TECHNICAL FIELD OF THE INVENTION

The present invention relates generally to electro-hydraulic brake systems, and relates more specifically to a retainer for a brake master cylinder travel sensor magnet.

BACKGROUND OF THE INVENTION

Master cylinders are commonly used in various applications, particularly in automobiles where they control various vehicular systems. For example, braking systems commonly known as brake-by-wire (BBW) or similar systems typically include a master cylinder that is isolated from the braking system. Such BBW systems rely on automatic electric or electric-hydraulic means to remotely activate the brake. Slave cylinders located at the automobile wheels typically actuate a braking process. Furthermore, one or more sensors positioned to monitor vehicle brake pedal position may control the process. The sensors measure pedal movement characteristics and relay this information to the brake system. The information is used to determine the appropriate braking force and is typically proportionate to a brake pedal force.

A potential shortcoming of current automobile master cylinder assemblies relates to positioning the sensors near the brake pedal. Situating the sensors on or near the brake pedal may require additional installation time and cost. Strategies for positioning a Hall effect sensor integral to a master cylinder are known thereby simplifying the packaging of the master cylinder-sensor assembly. The Hall effect sensors are capable of detecting minute perturbations in magnetic fields. These sensors, for example, may be used to precisely measure the movement of a neighboring permanent magnet that moves in response to a brake pedal motion.

The U.S. Pat. No. 4,918,921 issued Apr. 24, 1990 to Leigh-Monstevens et al. is an example of a coaxial push rod and ball screw nut drive for a master cylinder. In the Leigh-Monstevens patent, several forms of master cylinder assemblies are disclosed, including one embodiment for use in a vehicle braking system. In the preferred form, the assembly includes an electrically driven motor, a ball screw, and a piston positioned coaxially within a master cylinder bore. During operation, the motor armature rotates thereby driving the ball screw into the piston and slidably moving the piston within the bore. The assembly may include a Hall effect sensor carried by the master cylinder. As the armature spins, the Hall effect sensor detects passage of a series of rotating circumferentially positioned permanent magnet segments. The linear position of the ball screw and piston are determined based on the rotation count measured by the sensor.

SUMMARY OF THE INVENTION

The present invention is an assembly for sensing travel by a piston in a master cylinder. The assembly comprises a magnet and a retainer for retaining the magnet proximate the piston. An orientation screw engages an axial slot in the piston to inhibit rotation of the piston.

Accordingly, it is an object of the present invention to provide an assembly of the type described above that reduces tolerances associated with prior art brake pedals and brackets.

Another object of the present invention is to provide an assembly of the type described above that allows the use of a captured push rod, and eliminates any need for a hat-type retainer.

Still another object of the present invention is to provide an assembly of the type described above that uses a captured push rod.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
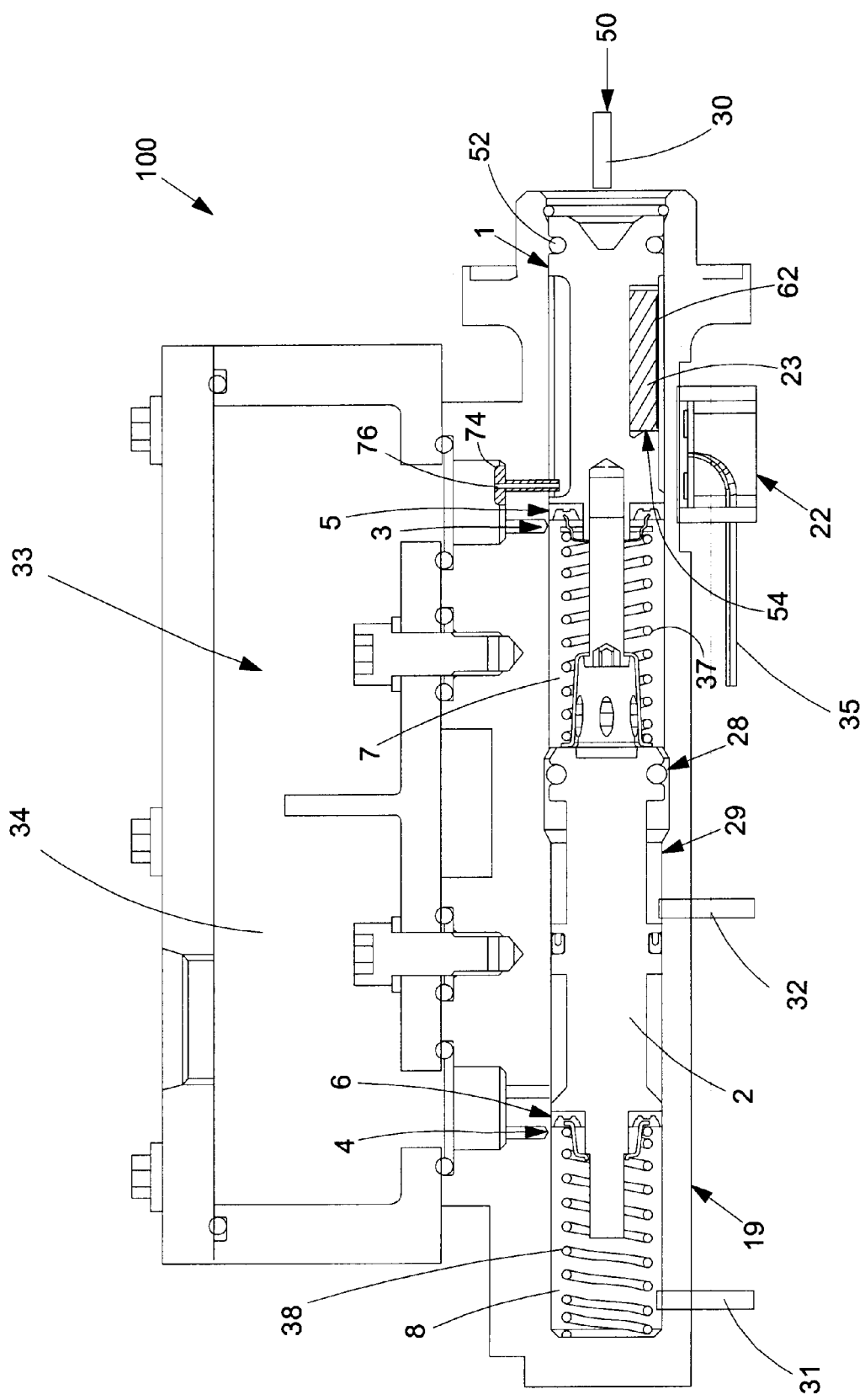
FIG. 1 is a partial fragmentary cross-sectional view of an upper portion of one embodiment of a master cylinder system according to the present invention.

FIG. 1 shows one embodiment of a brake master cylinder system 100 according to the present invention. The brake master cylinder system 100 includes a primary piston 1 slidably positioned in a master cylinder 19, a magnet 23 positioned on the primary piston, and a sensor 22 disposed on the master cylinder. A change of primary piston 1 linear position causes a change in a magnetic field position sensed by the sensor 22, and a brake control signal proportional to the change of linear piston position is generated. For the purposes of the following description, a change in linear position constitutes a transverse lateral movement within the master cylinder 19.

In one embodiment, the master cylinder 19 may be formed of an acceptably rigid and non-ferrous material such as aluminum. A longitudinal main bore 29 extends through the master cylinder 19. The master cylinder 19 slidably carries the primary piston 1 that may be operably attached to a push rod 30. The push rod 30 exerts a force on the primary piston 1 proportionate to a force 50. The force 50 may be the result of an applied brake pedal force or other force applied to the brake master cylinder system 100. The primary piston 1 may be operably in contact with a secondary piston 2 slidably carried in the main bore 29. A reservoir 33 may be associated with the master cylinder 19 and carry a fluid 34 such as a hydraulic brake fluid. The reservoir 33 provides a non-pressurized gravitational flow of fluid 34 into the master cylinder 19 through both a primary bypass hole 3 and a secondary bypass hole 4.

A primary seal 5 may be operably attached to the primary piston 1 and fluidly isolate a primary chamber 7 from the reservoir 33 upon sliding beyond the primary bypass hole 3. A second primary seal 6 may be operably attached to the secondary piston 2 and fluidly isolate a secondary chamber 8 from the reservoir 33 upon sliding beyond the secondary bypass hole 4. A primary spring 37 may be positioned in the primary chamber 7; a secondary spring 38 may be positioned in the secondary chamber 8. The master cylinder 19 may be in fluid communication with one or more "feel" emulator devices designed to produce differential non-linear brake pedal force versus pedal travel characteristics.

The sensor 22 may be attached to a flat surface on one side of the master cylinder 19 by threaded fasteners (not shown) and to a brake system (not shown) via one or more wires 35. The integral placement of the sensor 22 with the master cylinder simplifies the packaging of the brake master cylinder system 100, and may reduce overall installation time and cost. The sensor may be a Hall effect transducer commonly used to continuously detect magnetic field flux. The sensor 22 interacts with a magnetic field produced by the magnet 23 positioned on the primary piston 1. In one embodiment, the sensor does not contact the magnet directly; the sensor 22 detects the magnetic field through the body of the master cylinder 19 and is therefore in a magnetic proximity to the sensor. The magnet 23 may be a permanent magnet with a bar or hollow cylindrical shape.

Figure 2:
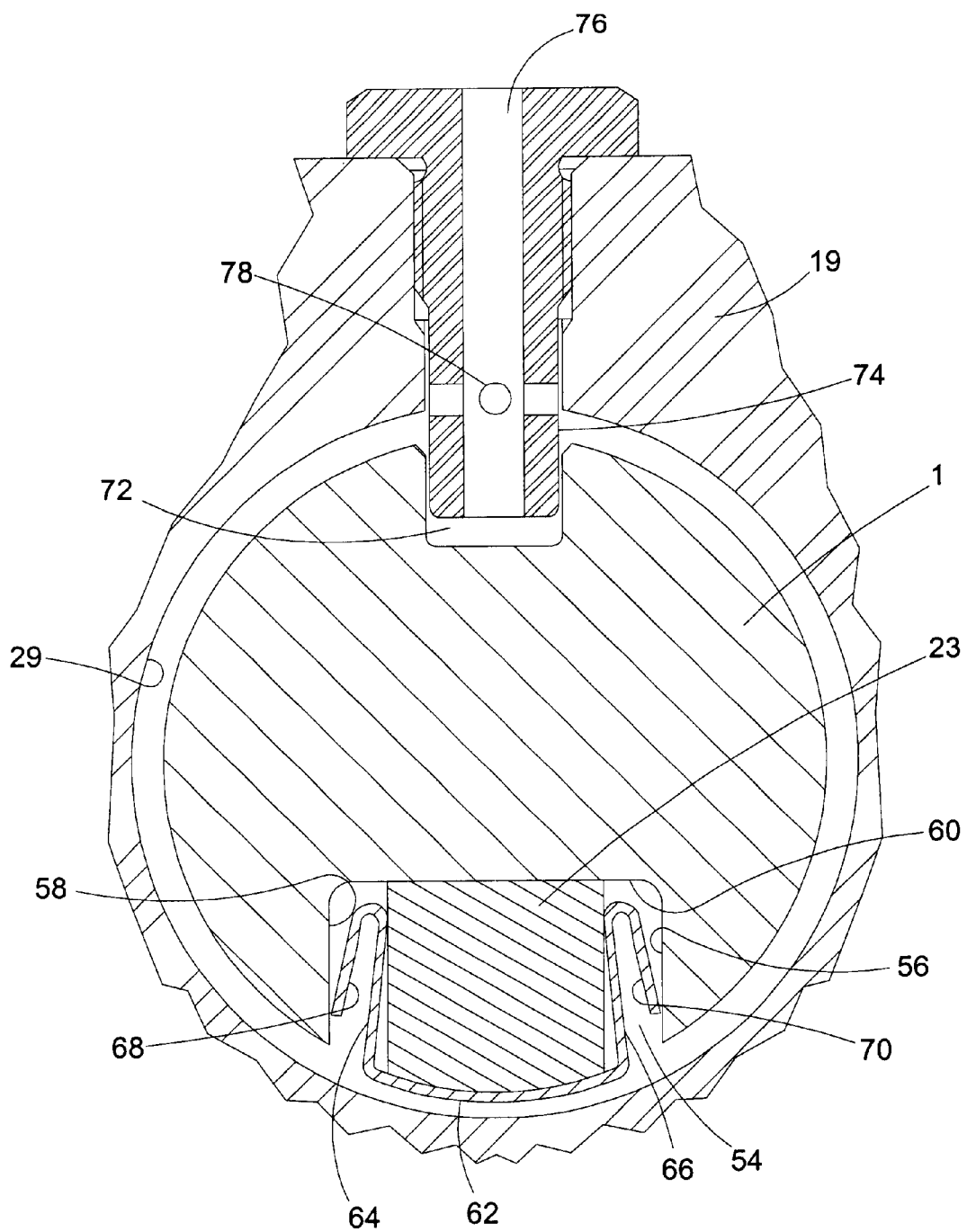
FIG. 2 is a partial cross-sectional side view of the master cylinder system.

The primary piston 1 is held concentrically within the main bore 29 of the master cylinder body 19 by the seal 5, and by an o-ring seal 52. As FIG. 2 shows, an axial slot 54 is machined into the primary piston 1 to form opposed side surfaces 56 and 58, and a bottom surface 60, to accept the magnet 23. The magnet is retained by inserting a spring clip 62 into the slot 54 such that the magnet is in contact with the horizontal surface 60. As the spring clip 62 is inserted into the slot 54, inner legs 64 and 66 of the spring clip deflect and make contact with the magnet 23 to center its position within the slot. In addition, outer legs 68 and 70 of the spring clip further deflect against the vertical surfaces 56 and 58 of the slot to provide a residual load to retain the magnet 23 in the slot.

In a preferred embodiment, an additional axial slot 72 is machined into the primary piston 1 to mate with an orientation screw 74 that is threaded into the master cylinder body 19. The closeness of fit between the slot 72 and the screw 74 inhibits rotation of the magnet 23, and consequently of the primary piston 1, in order for the magnet and the Hall effect sensor 22 to function most effectively. A bore 76 and cross-drilled holes 78 through the orientation screw 74 provide a compensation function for the primary master cylinder circuit.

The generated brake control signal may be proportional to a primary piston linear travel; the primary piston 1 linear travel may be proportional to a brake pedal (not shown) movement. In one embodiment, the sensor 22 may detect a primary piston 1 linear travel of 25 to 30 cm or more. The brake control signal may be sent electrically to a vehicle brake system (not shown) via the wires 35. Furthermore, the vehicle brake system may be activated in proportion to a brake control signal intensity. In one embodiment, the brake control signal intensity generated by a Hall effect sensor is positively correlated to the progressive increase in the brake pedal force and movement. Thus, the vehicle brake system may be activated in proportion to the brake pedal force.

The present invention achieves an integral piston linear position measurement without the need for an electrical motor. Furthermore, the present invention allows for variations that permit detection of a change of the piston linear position by sensing a change in a magnetic field. For example, several master cylinder assemblies currently available may be adapted to carry a magnet on one or more pistons within the master cylinder. Additionally, a sensor, such as a Hall effect-type sensor, may be positioned on the master cylinder body to detect the linear movement of the magnet and associated magnetic field thereby producing a signal relating to a force applied to the assembly.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An assembly for sensing travel by a piston in a master cylinder, the assembly comprising:
   a magnet;
   a spring clip retaining the magnet proximate the piston; and
   an orientation screw engaging an axial slot in the piston to inhibit rotation of the piston.

2. The assembly of claim 1 further comprising a sensor disposed proximate the magnet far sensing travel of the magnet.

3. The assembly of claim 1 further comprising a Hall effect sensor disposed proximate the magnet for sensing travel of the magnet.

4. The assembly of claim 1 wherein the magnet comprises a permanent magnet.

5. The assembly of claim 1 wherein the magnet comprises a bar magnet.

6. The assembly of claim 1 wherein the magnet is disposed in a second axial slot in the piston.

7. The assembly of claim 1 wherein the retainer includes at least one inner leg in contact with the magnet.

8. The assembly of claim 1 wherein the spring clip includes at least one outer leg in contact with a second slot in the piston.

9. The assembly of claim 1 wherein the retainer includes at least one U-shaped leg, including an inner leg in contact with the magnet and an outer leg in contact with a second slot in the piston.

10. A master cylinder comprising:
    a piston having first and second axial slots,
    a magnet disposed in the first axial slot;
    a spring clip retaining the magnet in the first axial slot; and
    an orientation screw engaging the second axial slot to inhibit rotation of the piston.

11. The master cylinder of claim 10 further comprising a sensor disposed proximate the magnet for sensing travel of the magnet.

12. The master cylinder of claim 10 further comprising a Hall effect sensor disposed proximate the magnet for sensing travel of the magnet.

13. The master cylinder of claim 10 wherein the magnet comprises a permanent magnet.

14. The master cylinder of claim 10 wherein the magnet comprises a bar magnet.

15. The master cylinder of claim 10 wherein the retainer includes at least one inner leg in contact with the magnet.

16. The master cylinder of claim 10 wherein the retainer includes at least one outer leg in contact with the first axial slot.

17. The master cylinder of claim 10 wherein the spring clip includes at least one U-shaped leg, including an inner leg in contact with the magnet and an outer leg an contact with the first axial slot.

18. A master cylinder comprising:
    a piston having first and second axial slots;

an orientation screw engaging the second axial slot to inhibit rotation of the piston;

a permanent magnet disposed in the first axial slot, and a retainer for retaining the magnet in the first axial slot, the retainer including at least one U-shaped leg having an inner leg in contact with the magnet and an outer leg in contact with the first axial slot.

19. The master cylinder of claim 18 further comprising a sensor disposed proximate the magnet for sensing travel of the magnet.

20. The master cylinder of claim 18 further comprising a Hall effect sensor disposed proximate the magnet for sensing travel of the magnet.

* * * * *